V. KREFL.
SHOCK ABSORBER.
APPLICATION FILED FEB. 10, 1921.
1,408,892.  Patented Mar. 7, 1922.
2 SHEETS—SHEET 1.
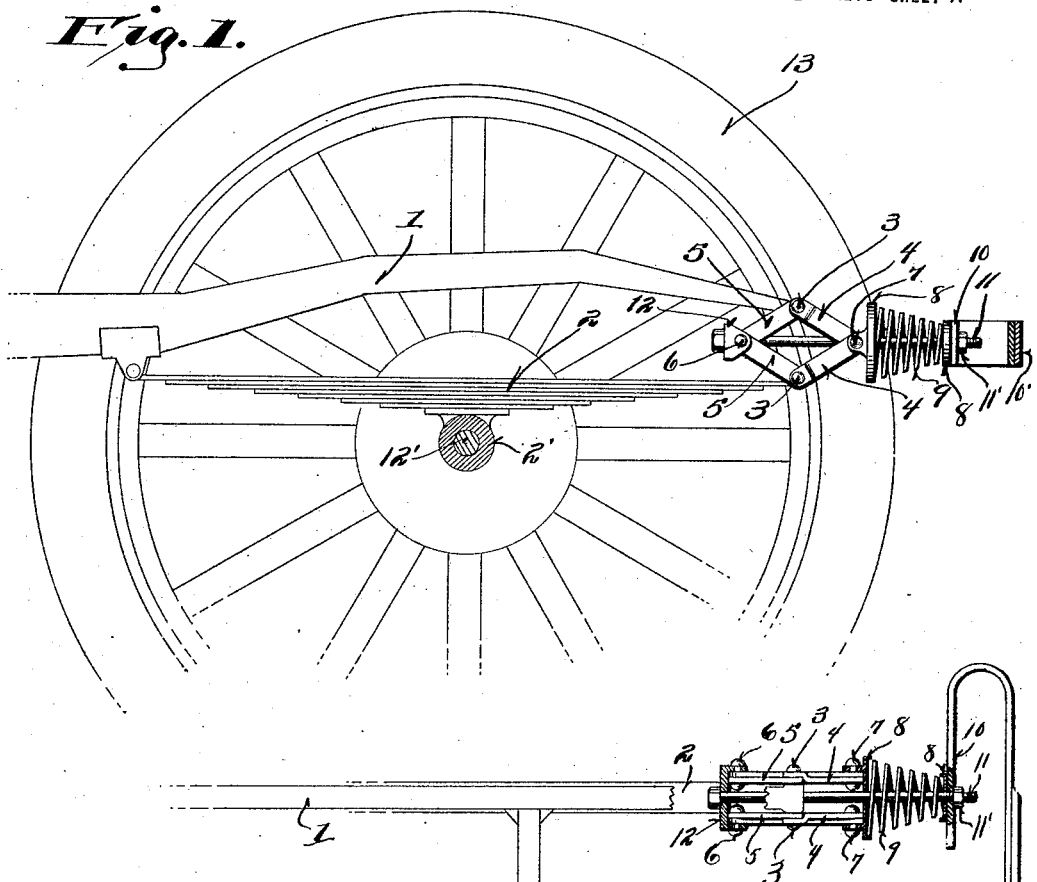
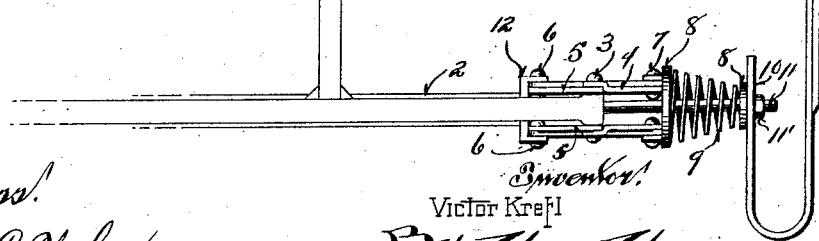
Witness:
Robert E. Weber
Inventor:
Victor Krefl
By Young & Young
Attorneys

V. KREFL.
SHOCK ABSORBER.
APPLICATION FILED FEB. 10, 1921.

1,408,892.

Patented Mar. 7, 1922.
2 SHEETS—SHEET 2.

Inventor
Victor Krefl

UNITED STATES PATENT OFFICE.

VICTOR KREFL, OF TWO RIVERS, WISCONSIN.

SHOCK ABSORBER.

1,408,892.　　　　　Specification of Letters Patent.　　Patented Mar. 7, 1922.

Application filed February 10, 1921. Serial No. 443,885.

*To all whom it may concern:*

Be it known that I, VICTOR KREFL, a citizen of the United States, and resident of Two Rivers, in the county of Manitowoc and State of Wisconsin, have invented certain new and useful Improvements in Shock Absorbers; and I do hereby declare that the following is a full, clear, and exact description thereof.

My invention refers to shock absorbers and it has for its primary objects to provide a shock absorber connection between a pair of load supports, in the form of a toggle link having an associated spring to permit the load supports to yield under the spring tension.

Another object of my invention is to associate a bumper with the shock absorber, whereby the springs will function both as shock absorbers and bumpers.

A still further object of my invention is to provide specifically a toggle link connection between a spring member and a frame member having associated therewith an auxiliary spring and tie rod whereby the parts are capable of yielding longitudinally under load strain to thus absorb the shock, and to insure a long life to the spring element.

With the above and other objects in view, the invention consists in certain peculiarities of construction and combination of parts, as are hereinafter set forth with reference to the accompanying drawings and subsequently claimed.

In the drawings:

Figure 1 represents a side elevation of the front portion of the vehicle equipped with a shock absorber embodying the features of my invention.

Figure 2 is a detail plan view of the vehicle frame showing the shock absorber attachment.

Figure 3:
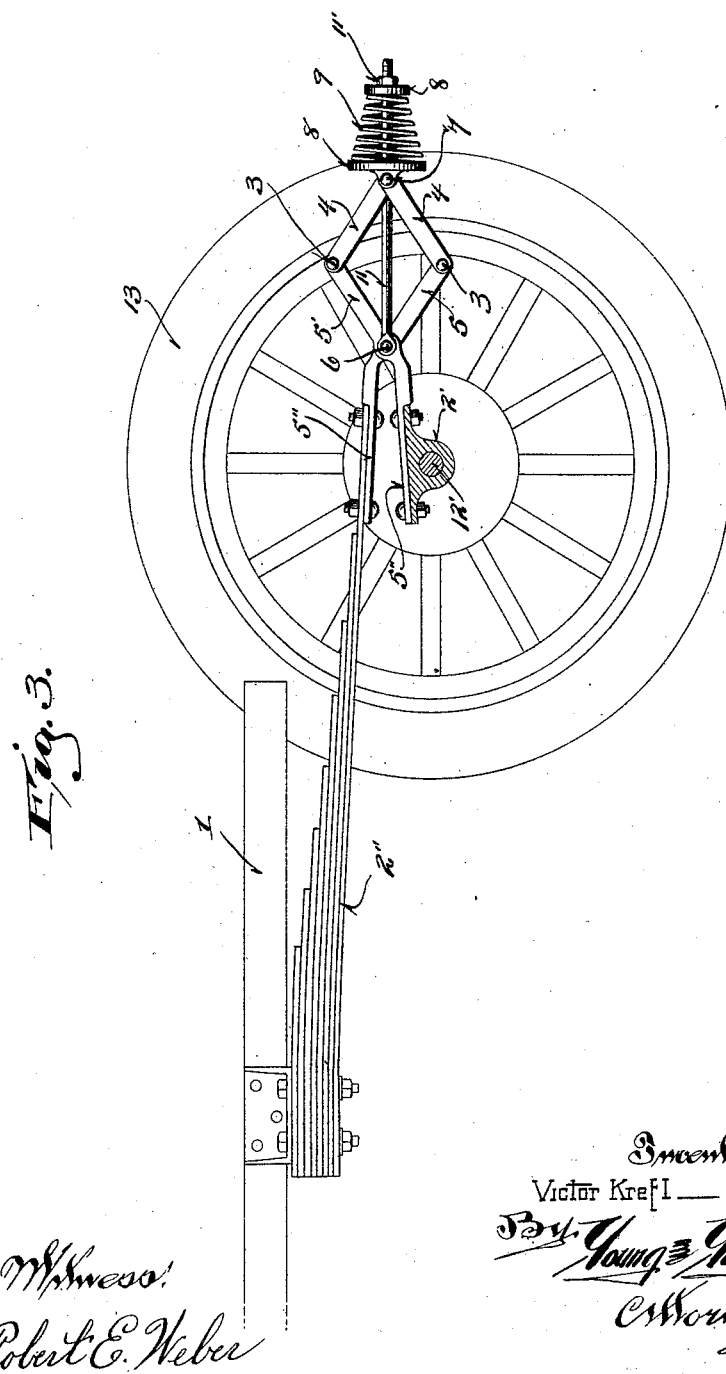
Figure 3 is a side elevation of another form of my invention.

Referring by characters to the drawing, 1 represents a frame beam comprising a rigid load supporting element and 2 a vehicle spring comprising a yieldable load support. One end of the spring is connected in the ordinary manner to the load support element 1 and the free ends of the two load supporting elements terminate with eyes which are suitably spaced apart, and which eyes are adapted to receive bolts 3. These bolts have pivoted thereto the outer ends of pairs of oppositely disposed links 4—4 5—5. The ends of the links 5—5 are brought together and connected by tie bolts 6, while the ends of the rearwardly inclined links are similarly brought together and connected by tie bolts 7. The tie bolts 7 also carry centrally apertured heads 8, which heads are adapted to receive the inner ends of coil springs 9. The outer ends of said springs 9 are engaged by the apertured ends of a strap 10, which strap is carried by tie rods 11, that extend through the head apertures and also through tie plates 12, which are as shown mounted upon the bolts 6. The inner ends of the tie rods are provided with the usual heads which normally abut the outer faces of the tie plates and the outer ends of the tie rods 11 are threaded for the reception of adjusting nuts 11'. Hence, it will be seen that the coil spring can be adjusted as to tension by manipulating the bolts 11' and this adjustment is for the purpose of regulating the resistance of the spring members in proportion to the load put upon the vehicle.

As best shown in Figure 2 of the drawing, the ends of the strap 10 in this instance are folded over in U-shaped formation, so that the main body of the strap 10' constitutes a bumper element. Obviously any type of bumper element can be used in connection with the shock absorber structure, or I may in some instances dispense with this element altogether and utilize a washer in connection with the tie rods only.

The lower support 2, which is shown as a leaf spring, has secured thereto the usual housing 2' for an axle 12', which axle is adapted to receive the ordinary type of wheels 13.

It will also be observed that while I have shown the upper load supports as a part of the rigid frame, obviously I may in some instances substitute an elliptical spring element therefor or vice-versa.

From the foregoing description, it will also be seen that the pairs of toggle links, together, constitute a lazy tong unit, which will expand and contract under various load conditions, whereby the coil springs will absorb shock, and the eyed end of the load elements are thus capable of lengthening out so as to avoid undue strain upon the leaf spring member or members, and thus avoid the tendency of breakage. It will also be observed that the shock absorber and associated parts can readily be adjusted to any standard type of vehicle, without changing the structural features, by simply disconnecting the usual tie bolt of the upper and lower load supports 1 and 2, whereby they may be spaced apart so as to insert the lazy tong unit.

It will also be observed that the links which connect the load supports serve to materially lengthen the spring base, which length is dependent upon the dimensions of the links, and in practice by employing a shock absorber of this type, it has been found that the riding qualities are materially increased and elimination of rattle and breakage is reduced to a minimum, the device being obviously capable of the desired flexibility in a structure of the type mentioned.

While I have shown and described certain methods of carrying out my invention structurally, it is understood that I may, without departing from the spirit of it, vary such structural features within the scope of the claims as they may be hereinafter interpreted by those skilled in the art.

Referring especially to Figure 3 of the drawings, the lazy tong units 5' in this instance are provided with legs 5", which legs are secured to the ends of the spring 2" constituting one of the load supports and the housing 2'. In other respects, the lazy tong structure and its associated coil spring are in substance the same as that shown in the first form of my invention previously described.

I claim:

1. A shock absorber comprising upper and lower load supports having ends spaced apart, a tie rod, a spring surrounding said tie rod, means on one end of said tie rod contacting with one end of said spring to limit the motion thereof, and movable means interposed between the other end of said spring and the other end of said tie rod for transmitting the force of said support to said spring.

2. A shock absorber comprising upper and lower supports, a tie rod, a pivot positioned on one end thereof, links mounted on said pivot and pivoted to said load supports, a second set of links, a common pivot for said second set of links, said links being connected to said supports and a spring interposed between said common pivot and the other end of said tie rod.

In testimony that I claim the foregoing I have hereunto set my hand at Two Rivers, in the county of Manitowoc and State of Wisconsin.

VICTOR KREFL.